Jan. 7, 1947.          D. E. MORRISON          2,413,727
                      ANTIAIRCRAFT DATA COMPUTER
                     Filed April 9, 1941       6 Sheets-Sheet 1

INVENTOR
Douglas E. Morrison
BY
ATTORNEYS

Jan. 7, 1947.  D. E. MORRISON  2,413,727
ANTIAIRCRAFT DATA COMPUTER
Filed April 9, 1941  6 Sheets-Sheet 2

Fig. 2.

INVENTOR
Douglas E. Morrison
BY
ATTORNEYS

Jan. 7, 1947. D. E. MORRISON 2,413,727
ANTIAIRCRAFT DATA COMPUTER
Filed April 9, 1941 6 Sheets-Sheet 4

Fig. 6.

INVENTOR
Douglas E. Morrison
BY
ATTORNEYS

Fig. 7.

Jan. 7, 1947. D. E. MORRISON 2,413,727
ANTIAIRCRAFT DATA COMPUTER
Filed April 9, 1941 6 Sheets-Sheet 6

61.5

Patented Jan. 7, 1947

2,413,727

UNITED STATES PATENT OFFICE 2,413,727

ANTIAIRCRAFT DATA COMPUTER

Douglas E. Morrison, United States Army,
Trenton, Ga.

Application April 9, 1941, Serial No. 387,657

16 Claims. (Cl. 235—61.5)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to an antiaircraft data computer.

The principal object of the invention is to mechanico-graphically represent to relatively small scale the position of a target in space, or successive positions of a moving target in space, from whence the course and speed of such moving target may be determined to predict the future position to be utilized in calculating firing data.

A further object is to provide a simple, rugged, practical data computer particularly adapted to calculating data for Case I½ automatic weapon pointing and easily altered for computation of data for Case III pointing, whereby it will be useful as an emergency antiaircraft gun fire control system, and wherein Cases I, I½, II and III are as defined in the Coast Artillery Field Manual—1933—vol. II, parts 2 and 3, page 332.

Another object of the invention is to provide a data computer that will compute correct data for dive courses of a target.

Still another object of the invention is to provide a data computer adapted to be provided with means for automatically applying corrections for positions of occupancy offset with respect to the firing battery for which the computer calculates data.

A still further object of the invention is to provide a data computer particularly suited to calculating firing data on low-flying fast moving targets.

Another object is to provide a data computer which will be suitable for use in determining firing data on terrestrial vehicles or marine craft.

The specific nature of the invention as well as other objects and advantages thereof will clearly appear from a description of a preferred embodiment as shown in the accompanying drawings in which.

Geometrical theory of computer

Figure 2:
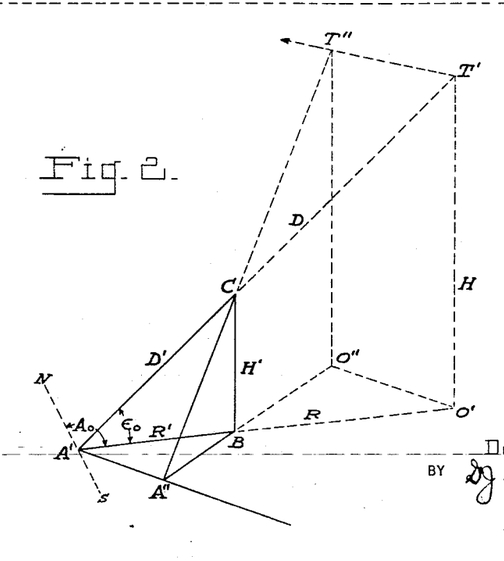
Fig. 2 is a diagrammatic view showing the geometrical principles involved in the instant data computer.

Referring now to Fig. 2, it will be seen that the present position of an aerial target, represented by the point T', may be located with respect to a terrestrial point A' by its altitude H, angular height $\epsilon_0$, and azimuth indicated by the angle $A_0$. It may also be seen that if a point, such as the point C, be located some distance H' above the horizontal plane to a scale proportional to the altitude H of the position T' of the target, that the point A' in the horizontal plane and in the line of sight A'CT' will lie at a distance R' from the horizontal projection of C at B which is proportional to the distance R of the horizontal projection of T' at O' from B to the same scale. Likewise the slant distances D' and D are proportional to the same scale as was chosen for H'. If the elevation H' of C is maintained in the same scale relation to the altitude H of the target's position, then R', R and D', D will bear the same scale relation as H' bears to H and the trace of A', such as A'—A", formed as line A'CT' is continuously directed upon an aerial target moving on the course T'—T" will be a scale reproduction of the horizontal projection of the target's course and travel O'—O" in proper orientation relative thereto.

The hereinafter disclosed embodiment of the present invention utilizes the above principles by providing an altitude shaft which is positioned to extend a distance H' above the horizontal plane of the instrument proportional to H to a suitable scale. A bar is positioned with one of its ends located at A', the initial point of tracking the target T', and when another point, such as A" on the target's course is established, the bar is further positioned to pass through both points A' and A" thus establishing a line parallel to the horizontal projection of the target's course Q'—Q". To measure the linear speed of point A' along the bar, it is only necessary to provide a suitable speedometer that is moved by means traveling with point A' and which is actuated by the relative motion of point A' and the bar from whence the horizontal projection or ground speed of the target may readily be determined. After determination of the target's speed, a distance proportional to the target's travel during the time of flight of the projectile is laid off ahead of point T' by instrumentalities provided for the purpose to determine the future position T'' of the target. Through other instrumentalities the angular measurements of the future position from point A' are made which is the data sought for Case 1½ pointing.

*Construction of the computer*

Figure 3:
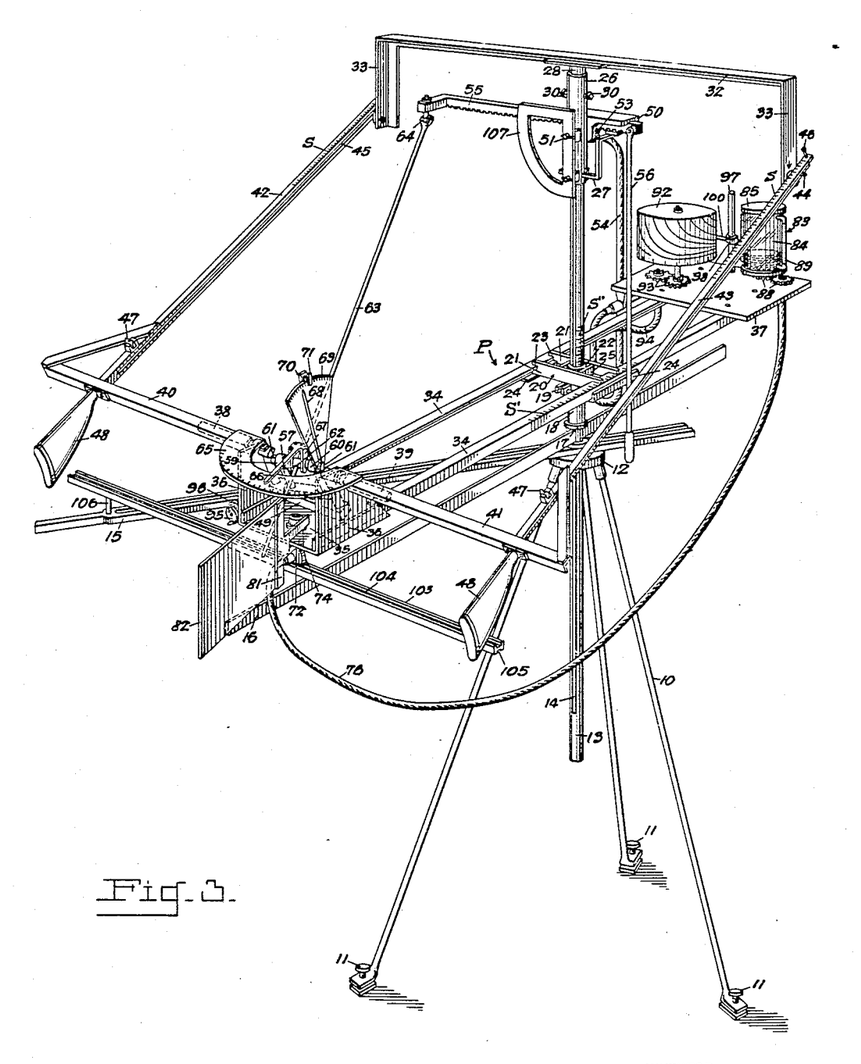
Fig. 3 is a perspective view of the data computer.

The preferred embodiment of the computer, generally indicated at P as shown in Fig. 3, comprises a central support which may take the form of a tripod 10 provided with devices 11 for leveling the head 12 thereof in a convenient manner to form a horizontally disposed support for the superstructure hereinafter more particularly described.

Figure 7:
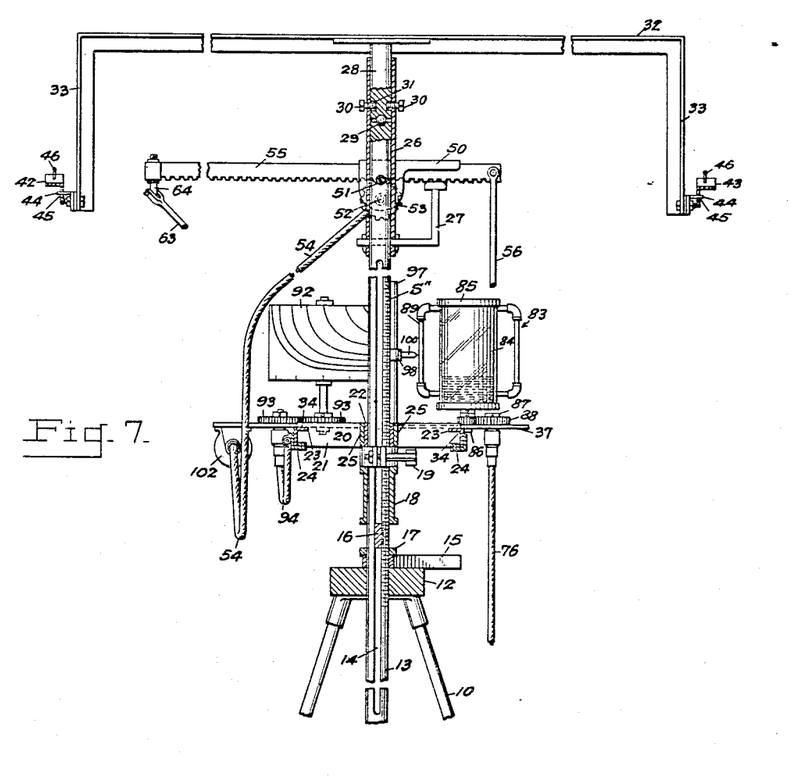
Fig. 7 is a sectional view taken upon the line 7—7 of Fig. 6.

Vertically slidably and freely rotatably mounted on the tripod head 12 is an altitude shaft rod 13 having a longitudinal diametral slot 14 therein. A horizontally disposed bifurcated damper bar 15 receives the altitude shaft 13 between the bifurcations thereof and is engagingly supported by the tripod head 12 for rotatable and radial movement relative to the altitude shaft. Superjacent the damper bar a travel channel bar support 16 is horizontally inserted through the slot 14 of the altitude shaft for horizontal and vertical relative sliding movement with respect to the latter. To facilitate relative rotary movement between the damper bar 15 and travel channel bar support 16, a thrust washer 17 is preferably interposed therebetween around the altitude shaft as shown in Fig. 7. Above the travel channel support a tubular element 18 flanged at opposed end portions is sleeved over the altitude shaft for rotative and sliding movement relative thereto and is engagingly supported on its lowermost flange by the travel channel bar support 16, as clearly shown in Figs. 3, 7 and 8.

Supported upon the upper end of the tubular element 18 is an altitude shaft clamp 19 of any suitable construction adapted to be clamped to the altitude shaft in any position along its length whereby the altitude shaft may be supported upon the sleeve 18 in various positions of vertical adjustment relative to the sleeve 18 and tripod head 12 support.

Figure 6:
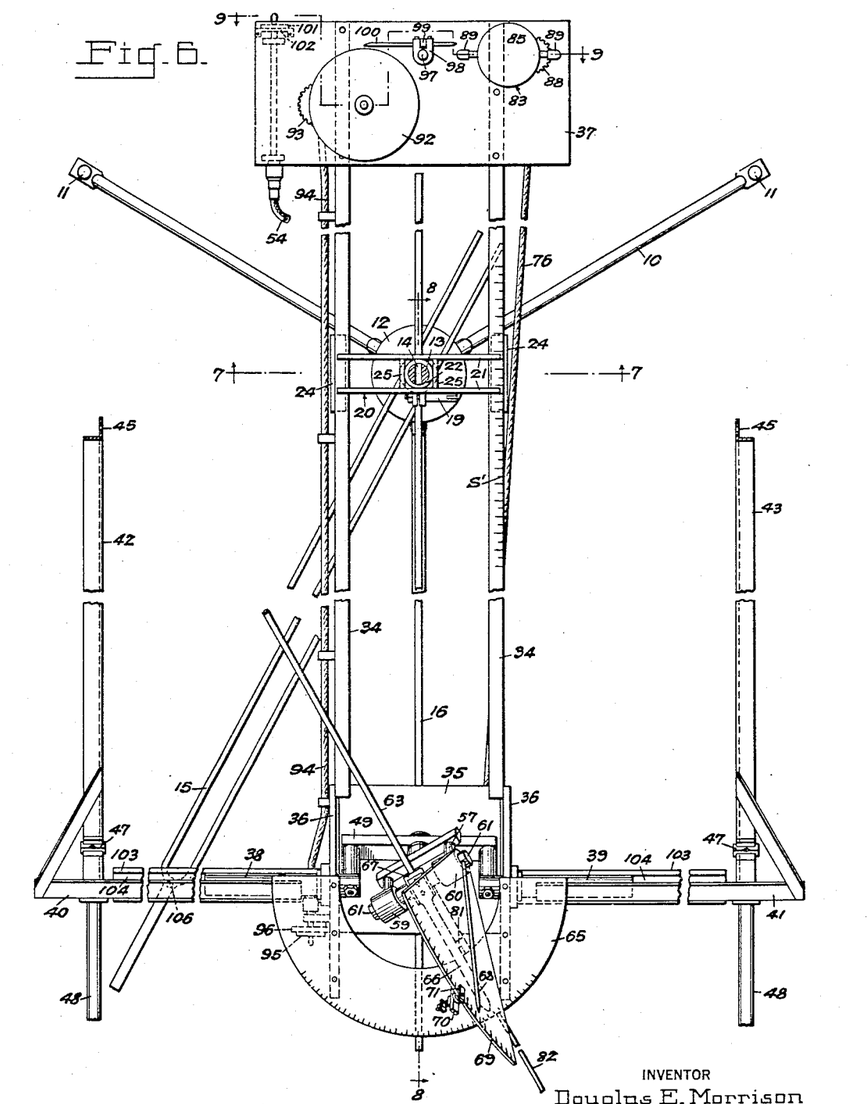
Fig. 6 is a sectional plan view taken upon the line 6—6 of Fig. 4.

Disposed above the altitude clamp 19 about the altitude shaft in abutting relation to the altitude clamp, there is a present horizontal range bar guide of any desirable construction generally indicated at 20 as seen in Figs. 3, 6 and 7. In the form shown, the bar guide comprises a pair of parallel bars 21 secured to a collar 22 mounted upon the altitude shaft in seated relation with respect to the altitude clamp. The bars 21 are disposed to extend equal and opposite distances diametrally of the altitude shaft and have their outer end portions identically inwardly slotted as indicated at 23. An angle iron 24 is secured to each pair of opposed end portions of the bars 21 with one leg of each of the angles arranged in slightly spaced confronting relation to adjacent ends of the bars 21 for a purpose later described. If desired the bars 21 may be reinforced by struts 25 interposed therebetween on opposite sides of the altitude shaft.

A tubular element 26 is sleeved over the upper end of the altitude shaft 13 and secured thereon by means of a combined locking member and stop 27 as shown in Figs. 3, 4, 5 and 7. Within the upper portion of the element 26 a stub shaft 28 is journaled for rotary movement relative to the altitude shaft. Conveniently a thrust bearing 29 may be interposed between the upper end of the altitude shaft and lower end of the stub shaft in the manner indicated in Figs. 5 and 7 and the stub shaft may be removably retained in operative position by means of stud screw fasteners 30 secured in the sleeve element 26 with their inner ends extending within an annular groove 31 formed in the stub shaft. A front slant range bar support 32 is secured intermediate its ends to the stub shaft 28 and is formed at its ends with depending portions 33, comprising a top harness.

A present horizontal range assembly or base slide, comprising in the illustrated form of the invention a pair of spaced horizontally disposed horizontal range angle bars 34, is slidably assembled on the present horizontal range bar guide 20 by arranging the horizontal legs of the angles 34 within the slots 23 of the bars 21 and the vertical legs of the angles 34 between the legs of angles 24 and the confronting ends of bars 21 in the manner clearly shown in Figs. 3, 6 and 7. The rear ends of angle bars 34 on one side of the altitude shaft have a frame member 35 of general U-shape in cross section secured thereon with the sides 36 of the frame extending upwardly, while a supporting member or plate 37 is removably secured to the front end portions of angles 34 remote from frame 35 on the opposite side of the altitude shaft. The bars 34 and the rear frame 35—36 may be termed a base slide.

Figures 4, 5:
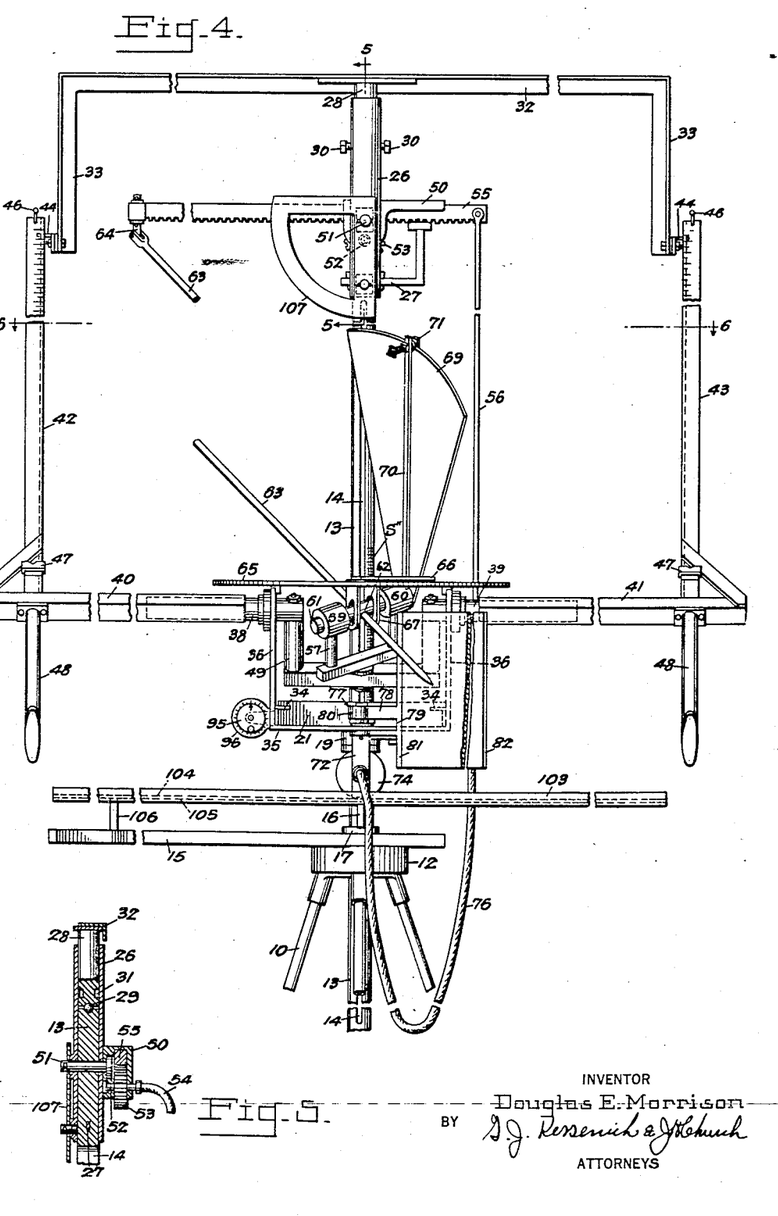
Fig. 4 is a view showing the data computer in rear elevation with certain parts broken away for the purpose of enlarging the scale.
Fig. 5 is a sectional view taken upon the line 5—5 of Fig. 4.

In opposed sides 36 of the frame 35 there are journaled in any suitable manner opposed coaxially aligned shafts 38 and 39, respectively, which may be extended outwardly equal distances to terminate in substantial alignment with the ends 33 of the front slant range bar support 32, or terminated short distances outwardly of the frame sides 36 and have separate rear slant range bar supports, such as the angle bars 40 and 41, respectively, as seen in Figs. 3, 4 and 6 secured thereon to extend outwardly to the above mentioned position of alignment. Normal to the support bars 40, 41 and in planes parallel to the depending ends 33 of the front slant range bar support, present slant range bars 42 and 43, respectively, are rigidly secured to the rear slant range support bars 40 and 41 and slidably secured to the depending end portions 33 of the front slant range bar support 32 as by pin and slot connections indicated at 44 and 45, respectively, as more clearly seen in Figs. 3, 4 and 7. The axis defined by the pivotal connections between bars 42 and 43 and ends 33 of support 32, intersects the axis of shaft 13 to define a first point. The present slant range bars 42 and 43 may be provided with front sights 46 and rear sights 47 of any desirable form and the rear slant range support bars 40 and 41 may be provided with shoulder rests or supports 48 to facilitate the operation of tracking a target. As may be seen by an inspection of Figs. 3, 4 and 6, the inner ends of the shafts 38 and 39 are rigidly joined by a cranked member 49 so arranged as to occupy a vertical depending position in the horizontal position of the present slant range bars 42 and 43. The intersection of the axis of aligned shafts 38 and 39 with a plane containing the axis of shaft 13 and parallel to bars 42 and 43, defines a second point.

A travel bar assembly is secured to the sleeve 26 intermediate the ends of the latter and comprises a housing member 50 pivotally attached to the sleeve 26 by means of a pivot pin 51 having its axis parallel to the slot 14, in any convenient manner as shown in Fig. 5. Adjacent the lower end of the housing member 50 there is journaled a shaft 52 in protruding relation to the side wall of the housing remote from the altitude shaft for receiving a pinion 53 within the walls of the housing as seen in Fig. 5. The pinion 53 is keyed or otherwise affixed to the shaft 52 and the protruding end of the latter is formed to receive the output end of a flexible cable 54 for rotation thereby. A travel bar in the form of a rack 55 is positioned through the housing member 50 in meshing engagement with the pinion 53 and is provided at its rightmost end, as viewed in Figs. 3 and 4, with a depending weighted bar 56 of such length as to be within facile grasp of an operator for manipulation to pivot the travel bar assembly about the pivot pin 51 and of such weight as to normally retain the travel bar 55 in a horizontal position abutting the combined locking member and stop 27 irrespective of the position of adjustment of the travel bar.

Figure 8:
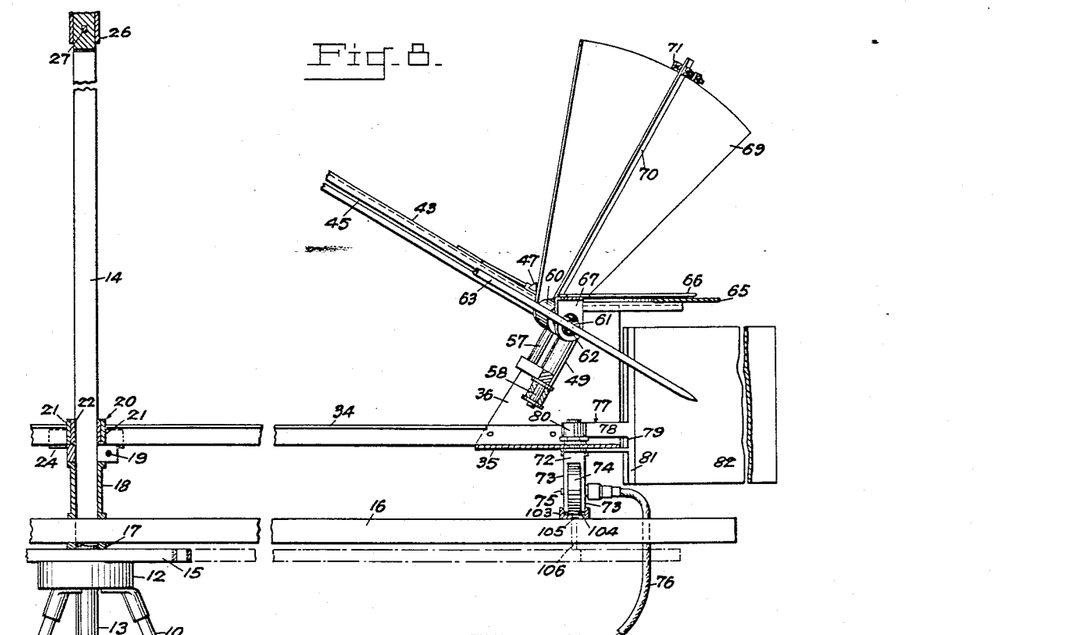
Fig. 8 is a sectional view taken upon the line 8—8 of Fig. 6 with certain parts shown in elevation for the sake of clarity.

Within the cranked member 49 there is mounted a U-shaped bracket yoke 57 on a yoke pivot 58 (Fig. 8) secured to the crank bar of said cranked member for pivotal movement about an upright axis normal to the axis of the crank bar as clearly shown in Figs. 3, 4 and 8. The upper ends of the yoke arms terminate in aligned bearings 59 and 60, respectively, which journal a yoke pin 61. The yoke pin 61 is formed with a diametral opening 62 intermediate the bearings 59 and 60 to slidably receive the rear end portion of a future slant range bar or rod 63 which has its forward end secured to a pin 64 pivotally mounted on the left end of the travel bar 55 as viewed in Figs. 3 and 4 for movement about a vertical axis. The interconnection between future slant range bar 63 and pin 64 determines a third point and is so arranged as to be in normally horizontal alignment with the pins 44 secured to the depending ends 33 of the forward slant range bar support 32 in order that these points may all lie in the same horizontal reference plane, and as may readily be ascertained by inspecting Figs. 3, 4, 6 and 8, sliding or pivotal movement of the travel bar 55 or sliding movement of the base slide toward or away from the shaft 13 will effect rotation of the yoke 57 and yoke pin 61 about the yoke pivot 58 through the medium of the future slant range bar 63 while the latter will relatively slide with respect to the yoke pin 61 through the opening 62 therein and effect rotation of the yoke pin 61 in its bearings 59 and 60.

An arcuate lateral deflection scale plate 65 is horizontally affixed to the upper edges of the sides 36 of the frame member 35 to extend rearwardly of the frame in the manner shown more clearly in Figs. 3, 4 and 6 and a lateral scale pointer 66 is affixed to the yoke pin 61 by means of a U-shaped clip 67 of such construction as to permit relative rotary motion of the yoke pin in its journal bearings 59 and 60 and the vertical component motion of the pin 61 due to movement of the crank member 49 around the axis of shafts 38—39 which may be considered one but that it will be moved by the pin 61 as the latter is moved by the yoke 57 in pivotal movement about its pivot 58 to cause the attached pointer 66 to indicate this sole lateral component deflection or movement. As best shown in Fig. 4, the legs of clip 67 may be formed with elongated slots having parallel sides spaced apart substantially the diameter of pin 61 to permit vertical movement of the pin relative to the clip but preventing relative lateral movement thereof.

Provision for reading vertical deflections is made by attaching a vertical deflection pointer 68 to the yoke pin 61 in upwardly directed relation for rotatable movement thereby over a vertical deflection scale plate 69 loosely mounted on the yoke pin 61 and held in adjusted position by means of a rod 70 (Fig. 8) fixed to the yoke pin bearing 60 and a friction device 71 carried by the rod. By this means the vertical deflection scale plate may be slipped about its mounting on the yoke pin 61 relative to the pointer 68 to correct for superelevation.

Directly under the opening 62 in the yoke pin 61, there is rotatably mounted in the frame 35 a wheel fork 72, with the fork depending below the frame and having flat outside surfaces as indicated at 73. A wheel 74 is journaled in the fork 72 by the axle 75 which projects outwardly of the fork on one side and is formed to receive the input end of a flexible speedometer cable 76 to impart rotation thereto upon rotation of the wheel 74.

Conveniently as shown in Figs. 4 and 8, a time of flight and superelevation plate support, generally indicated at 77, comprises a vertically disposed plate 78 slotted as shown at 79 to receive the web of frame 35 and has a collar 80 secured thereon fitted over an upper extension of the wheel fork 72 for pivotal movement. The rear end of plate 78 has a vertical bar or plate 81 secured thereto which suitably mounts a time of flight and superelevation scale plate 82 over the scales of which the rear end of the future slant range bar 63 may move to thus indicate time of flight and superelevation.

Upon the platform 37 is mounted a speedometer which may be of any suitable type, but which is herein shown to be of the hydraulic type actuated by centrifugal force. The speedometer generally indicated at 83 and more particularly disclosed in Figs. 3, 7 and 9 comprises a cylindrical container 84, having a removable closure 85, mounted upon the platform 37 for rotation about its axis through means of a suitable stub shaft 86 journaled in the platform and secured in any convenient manner to the container axially thereof. A second stub shaft 87 is journaled in the platform 37 and constructed to removably receive the output end of cable 76 to be rotated by the latter. Stub shafts 86 and 87 are interconnected by gears 88 of any desirable ratio whereby motion of the wheel 74 will be transmitted to stub shaft 86 through flexible cable 76, stub shaft 87 and gears 88. The container 84 is provided with one or more indicating gauges 89 by which an operator may visually determine the height of the column of liquid in the gauges. To provide for uneven tracking of the target wherein fluttering of the columns in the indicating gauges would take place, the openings leading to the gauges at the bottom are made relatively small as indicated at 90 in Fig. 10, and in order to prevent the upper surface of the column of liquid in each gauge from inclining outwardly thereby causing erroneous readings, small floats 91 of spherical or other suitable shape may be placed in the gauges to rest upon the upper surface of the columns in the gauges.

There is also mounted on the platform 37 a multiplying cylinder 92 arranged for rotation about its axis which is disposed in the vertical plane. The cylinder has multiplication curves plotted thereon using as arguments time of flight and travel of target per second.

The curves on cylinder 92 may be formed by plotting the same on rectangular coordinate graph paper whereon abscissas represent time of flight of the projectile and ordinates represent target speed. The curves are, then, constant product curves or hyperbolas, each curve corresponding to a particular distance of target travel for all times of flight and target speeds within the range of the instrument. Obviously, the number of curves plotted and the intervals between successive curves, are matters of choice or selection, based upon experience and skill of the operating personnel. Interpolation is used in those situations where the end of pointer 100 adjacent cylinder 92 falls between two adjacent curves.

Conveniently the cylinder is rotatable in time of flight by intermeshing gears 93 operably connected to a flexible shaft 94 which is operable by a handwheel 95 secured to the frame 35 adjacent the time of flight scale plate 82. An index plate 96 suitably graduated in time of flight is mounted adjacent the handwheel 95 and the latter is provided with an index whereby an operator may read the time of flight indicated on the time of flight scale plate 82 and position the cylinder 92 through the handwheel 95 by aligning the index thereon with the time of flight graduation on the index plate 96 corresponding to the time of flight read from a conventional time of flight chart or scale (not shown) that is suitably affixed on plate 82.

Thus, for instance a table for 50 caliber machine gun ammunition, which table may be used as a basis of preparation of such a scale or chart is as follows:

| Range | Time of flight |
|---|---|
| Yards | Seconds |
| 100 | 0.11 |
| 200 | .22 |
| 300 | .34 |
| 400 | .47 |
| 500 | .60 |
| 600 | .74 |
| 700 | .89 |
| 800 | 1.04 |
| 900 | 1.20 |
| 1000 | 1.38 |
| 1100 | 1.57 |
| 1200 | 1.76 |
| 1300 | 1.96 |
| 1400 | 2.18 |
| 1500 | 2.41 |
| 1600 | 2.66 |
| 1700 | 2.92 |
| 1800 | 3.18 |
| 1900 | 3.45 |
| 2000 | 3.74 |

A different scale would be provided for use with each different kind of ammunition in accordance with its ballistic values, customarily stated by the manufacturer.

Figures 9, 10:
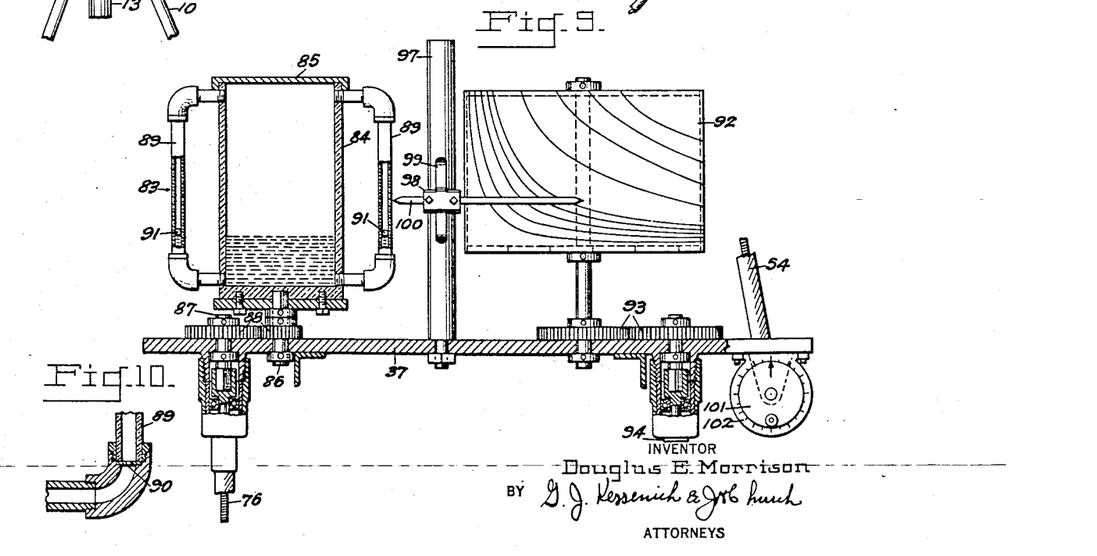
Fig. 9 is a sectional view taken upon the line 9—9 of Fig. 6 with certain parts shown in elevation to better illustrate the invention.
Fig. 10 is a sectional view showing a detail of the speedometer.

A vertical standard 97 is secured to the support 37 intermediate the speedometer 83 and multiplying cylinder 92. The standard has slidably mounted thereon a block 98 adapted to be frictionally retained in vertical position of adjustment relative thereto by a spring 99 secured to the block in frictional engagement with the standard. The block 98 also has secured thereto transversely of the standard a double ended pointer 100 arranged in such manner that the left end, as shown in Fig. 9, may be positioned in horizontal alignment with the upper surface of the liquid in the indicator tubes 89 of the speedometer while the right end will extend over the multiplication curves on cylinder 92 in proper relation.

An observer stationed at the multiplication cylinder 92 may read the total travel of the target (rate × time of flight) and displace the travel bar 55 through the flexible cable 54 by means of a handwheel 101 mounted upon the support 37 and suitably interconnected with the flexible cable 54. As in the case of handwheel 95, the handwheel 101 will have an index engraved or otherwise affixed thereon to be aligned with the proper graduation on a scale plate 102 graduated in terms comparable to the curves on cylinder 92.

For a purpose more clearly made apparent hereinafter, a travel channel 103 having a channel 104 adapted to snugly and slidably receive the sides 73 of the wheel fork 72 with the wheel rollably engaging the web of the channel is provided. The travel channel is also formed with a groove 105 in the bottom of its web adapted to receive a pin 106 fixed to the damper bar 15 adjacent the point of bifurcation of the latter. The travel channel 103 may be supported upon the travel channel bar support 16 and pin 106 in the manner shown in Fig. 3 in any desired relative position with respect thereto.

*Operation*

Figure 1:
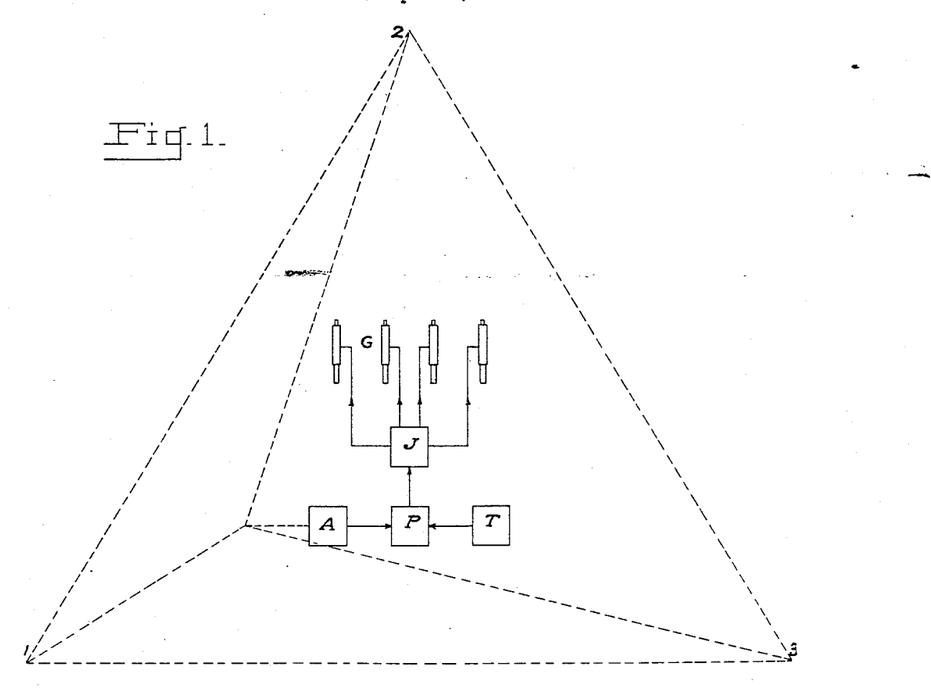
Fig. 1 is a schematic view of a fire control system embodying the data computer of this invention.

In operation the computer P will be organized into a system corresponding to that generally shown in Fig. 1, wherein a plurality of altitude observers stationed at the stations 1, 2, 3, etc., disposed a suitable known distance apart will transmit angular heights of an engaged target to an altitude instrument A. The operators at the altitude instrument will select angular heights from two of the stations 1, 2, 3, etc., best located for determining the altitude of the engaged target and transmit the altitude computed to the data computer P in any desired manner. It will be understood that the altitude may, of course, be determined in any conventional way in lieu of the manner indicated, such for example, by the use of a height finder of the self-contained base type, either stereoscopic or coincident.

The altitude setter man stationed at the computer P receives the altitude transmitted from altitude instrument A and positions the altitude shaft 13 accordingly by means of a suitable altitude scale affixed to the shaft readable against an index on the bar guide 20. When the altitude shaft is properly positioned to scale, it is clamped in such position by the altitude shaft clamp 19 and a value corresponding to H' of Fig. 2 is thereby set in the instrument. During the operation of positioning the altitude shaft, the right and left pointers stationed at the present slant range bars 43 and 42, respectively, as viewed in Fig. 3, will by means of the shoulder rests 48 and front and rear sights 46 and 47 align the sights with the engaged target through rotation of the instrument about the altitude shaft 13 and sliding the present horizontal and slant range assembly or base slide on the horizontal bar guide 20 and pins 44. As soon as the sights 46, 47 are trained upon the target, the present slant range bars 42, 43 will make an angle $\epsilon_0$ with the horizontal corresponding to this same angle shown in Fig. 2. During the process of aligning the sights 46, 47 upon the target, the travel channel bar 103 is manually moved pivotally around the shaft 58 axis so as to be disposed with the groove 105, receiving pin 106 of the damper bar 15 and across the travel channel bar support 16 in the approximate direction of the course of the target. The damper bar operator swings the damper bar 15 about the altitude shaft and as soon as the pointers signify they are upon the target, he so positions the damper bar that pin 106 disposed within the groove 105 of the travel channel will lie in the vertical prolongation of the axis of the travel wheel fork 72 which establishes a point corresponding to the point A' in Fig. 2. After the pin 106 has been positioned in accordance with the initial point of tracking, it is retained in such position by the damper bar operator and further tracking of the target by the pointers will cause the travel wheel fork 72 and travel wheel 74 to effect horizontal rotation of the travel channel 103 about pin 106 to assume a position parallel to the horizontal projection of the target's course as indicated at A', A" in Fig. 2. The travel channel bar support operator swings the travel channel bar support 16 to a position normal to the travel channel. The travel channel bar support 16, which passes through the long slot 14 of the altitude rod 13, thus turns the latter as the operator maintains bar 16 normal to travel channel 103. It has been described above that the travel bar 55 is supported on altitude rod 13 in predetermined angular relation thereto. Hence by maintaining the travel channel bar support 16 normal to the travel channel 103, the travel bar 55—which is supported on altitude rod 13 in a direction normal to its slot 14 and hence normal to bar support 16—will be parallel to the travel channel 103. The travel channel bar support operator keeps the travel channel bar support 16 normal to the travel channel 103 at all times.

The time of flight reader reads the time of flight from the scale plate 82 indicated by the rear end of the future slant range rod 63 which is fashioned as a pointer and transmits the time of flight by means of the handwheel 95 and flexible cable 94 to the multiplying cylinder 92 to rotate the latter to a position corresponding to the time of flight. It is stated in the sentence just preceding that the time of flight operator reads the time of flight from the scale plate 82. It might seem puzzling that the time of flight can be determined from scale plate 82 and cooperative pointer or future slant range rod 63 when it is realized that the future slant range rod 63 cannot be properly positioned, to read scale 82, until the travel bar 55 has been adjusted leftwardly, Fig. 3, in accordance with the total travel, and that one of the factors in determining total travel is time of flight. As a matter of fact, the first time of flight value entered by the operator in handwheel 95 to be transmitted to calculating drum 92, Fig. 3, is not read from the scale plate 82, but is an estimated value of the time of flight which the operator approximates as closely as possible to the actual value under existing conditions. Having entered this estimated time of flight, one of the operators proceeds to read the total travel from the multiplying cylinder 92 and adjusts the travel bar 55 according to the total travel. This adjustment of travel bar 55 changes the orientation of the future slant range bar 63 and consequently the time of flight as shown by the scale plate 82 which cooperates with the pointer end of bar 63. The time of flight operator again reads the scale plate 82 to find the time of flight as affected by the new position assumed by the bar 63. If the estimated time of flight initially used for setting the multiplying cylinder 92 happens to be the actual true value of the time of flight, this will be the value of the time of flight as shown by the scale plate 82. If the estimated time of flight was not the actual true value, then the time of flight shown by the scale plate 82 will be a different value than the estimated value initially used, and will be a value close to such actual value, at least the read time of flight will be far nearer to the actual value than the estimated value initially assumed. In the latter case the multiplying cylinder is set to the read, more accurate value of time of flight. The multiplying cylinder 92 is re-set with respect to time of flight until the value read from scale plate 82 is the same as the time of flight setting of the multiplying cylinder, which will usually be one or two adjustments if the initial estimated value is fairly close to the true value—a greater number of settings will be required if the estimated value is considerably different from the actual true time of flight. It should be observed that the required time of flight is the future time of flight, as represented by the adjusted position of point 64, Fig. 3, of the device. Before travel bar 55 is extended leftwardly in accordance with the amount of total travel, the point 64 will represent the present time of flight. The future time of flight is greater than the time of flight to the present position, in the arrangement of this device; the present time of flight, the value of which may be read from scale plate 82, before travel bar 55 is adjusted, is helpful in estimating the future time of flight. As the pointers track the target, the speedometer wheel 74 will roll along the travel channel 103 proportionately to the ground speed of the target and thereby rotate the speedometer 83 through the flexible cable 76 which is attached to the speedometer wheel 74 and speedometer 83. The liquid in the speedometer will rise in the indicator tubes 89 thereof under the action of centrifugal force and the travel bar setter will move the block 98 on standard 97 to cause the left end of pointer 100 as viewed in Fig. 9 to coincide with the upper surface of the liquid in the indicator tubes 89 and read the total travel as indicated by the nearest curve under the right end of the pointer 100 on the multiplying cylinder 92. Interpolation may be employed in those cases where the pointer falls between two adjacent curves. The total travel read from the curve on cylinder 92 beneath the end of pointer 100 adjacent thereto is transmitted to the travel bar 55 by handwheel 101, flexible cable 54 and the rack and pinion assembly shown in Fig. 5 to displace the rack proportionately. Proper displacement of the rack will position pin 64 in accordance with the future position of the target.

When the future position rod 63 has been displaced to conform with the future position, such as point T" in Fig. 2, its rear end portion will rotate the yoke 57 about its pivot pin 58 independently of any relative movement therebetween effected by movement of the crank 49. Movement of the yoke will in turn effect relative movement of the horizontal deflection pointer 66 and scale plate 65 and the vertical deflection pointer 68 and scale plate 69, such movements being horizontal and vertical deflection component angular deflection measurements of the future position from the present position, respectively. Superelevation may be read from plate 82 against the pointer end of the future slant range rod 63 just as in the case of time of flight and the plate 69 turned about its mounting on yoke pin 61 angularly to correct for this factor being held in adjusted position by the friction device 71. The vertical and lateral deflection corrections as read from plates 69 and 65, respectively, will be transmitted to the guns by any suitable transmission system through a junction box J as shown in Fig. 1.

If it is desired to read the present slant range of the target, a scale S may be affixed to one or both of the bars 42, 43 readable against an index on the depending end 33 of the front slant range bar support 32, as shown in Fig. 3. It will be recognized that the value read on scale C corresponds to D′ in Fig. 2. Likewise present horizontal range may be read from a scale S′ on the horizontal range bars 34 and altitude from a scale S″ corresponding, respectively, to R′ and H′ in Fig. 2.

Accommodation to diving targets

To track a diving target properly, the travel bar 55 must be placed in parallelism with the target course, that is, in the vertical plane parallel to the flight of the target and then depressed to the angle of dive of the target. As the instrument measures and computes horizontal travel during time of flight, it will be seen that in the case of a diving target, that the lineal displacement of travel bar 55 to establish the future position will not be the value indicated by the multiplying cylinder 92 but such value divided by the cosine of the angle of dive. Where the dive is determined by a separate instrument, such as indicated at T in Fig. 1, and transmitted to the computer P, it is then necessary to provide a dive scale 107 cooperating with the travel bar 55 to determine the angle of depression of the latter about the pin 51.

In operation the course having been established before the target entered its dive, upon perception of the dive, the travel channel 103 will be retained in its established position or locked in such position by suitable means provided for the purpose. The altitude shaft 13 is then unlocked from clamp 19 and the intersection of the line of sight with the horizontal plane (A′ Fig. 2) constrained to move along the travel channel 103 in tracking the target. This procedure automatically sets the changing altitude H′ into the instrument since the sights are maintained on the target by movement of the altitude shaft through the operators, slant range bars 42, 43, bar 32 and connection of the latter with the altitude shaft as shown in Fig. 5 as the sights under conditions where the travel wheel 74 is constrained to move along an established path with changing altitude may be changed in angular height by movement of the altitude shaft alone. The travel bar 55 is depressed by the bar 56 to a position corresponding to the angle of dive as will be indicated on scale 107 and the predicted travel set upon the bar through the pinion 53, flexible shaft 54 and handwheel 101. Any convenient means may be provided to reduce the horizontal travel indicated by the multiplying cylinder 92 to the corresponding cosine or distance along the dive course, such for example, as a separate multiplying cylinder rotatable in dive angle by a flexible cable attached rigidly to the pin 51 and readable in ordinate scale in terms of cosine travel indicated by the cylinder 92, or a multiplying chart or grid or plate fastened to the altitude shaft in such a position that it will be in a vertical plane adjacent to the vertical plane containing the travel bar so that when the travel bar is depressed it will move or rotate over the face of the plate or grid. The plate or grid may be marked with vertical lines spaced at intervals of one inch beginning at the center of the altitude shaft. When the travel bar has been depressed to the angle of dive of the target, the predicted or future position represented by the lower end of pin 64 on the travel bar 55 is moved away from the present position until it reaches a point where its horizontal distance from the center of the altitude shaft is the distance indicated by multiplying cylinder 92. The vertical lines on the grid or plate are a measure of the horizontal distance indicated by cylinder 92 to a suitable scale. This latter arrangement is not as accurate as the other suggested methods, but it is simple and rapid in operation, and during its operation frees the altitude shaft operator to assist the travel bar operator and the two operators will together produce very good results.

If a target is engaged after it has started diving, it will be necessary to set in an initial altitude and approximate the target course with the travel channel 103 thereafter holding the travel channel in approximated target course position and releasing the altitude shaft clamp 19 whereby the computer may then function as above described.

Miscellaneous

For offset firing or that class of firing wherein the computer is operated at some distance from the guns, any suitable means may be employed, as will be obvious to those skilled in the art, to correct the deflections computed for the parallax introduced by the offset position of the computer.

In the case of indirect or case III, firing the double cranked member 49 is not necessary and the deflection scales will be replaced by azimuth and elevation scales while fuse range may be determined by a suitable fuse range scale operably attached to the yoke assembly.

Practical scales for the instrument are 40 to 50 yards to the inch for automatic weapons and 100 to 125 yards to the inch for three inch cannon or larger guns.

I claim:

1. In fire control apparatus for tracking an aircraft target travelling at a known altitude, the combination of a support provided with a seat and means for leveling its seat, a vertical scaled extensible rod supported in the said support seat for an extent of vertical adjustment, a horizontal front harness rotatively mounted at the top of the said vertical rod, a rearwardly extended base slide mounted on the said support for rotational adjustment about the said vertical rod and for radial adjustment relative thereto, a U-shaped frame included at the rear end of the said base slide, a horizontal shaft rotatively mounted in the side walls of the said frame and extending parallel to the said top harness, a target sighting barrel secured at each end of the said horizontal shaft and slidingly connected to the ends of the harness whereby the target may be sighted and its angular travel marked by turning the base slide and with it its pair of sighting barrels and the harness in azimuth about the said vertical altitude rod and by radial movement of the said base slide relative to the altitude rod, a roller swivelly mounted on the underside of the said frame of the base slide and vertically aligned with the center axial point of the said horizontal shaft, a horizontal trackway provided with an upper channel adapted to receive the said roller and to be oriented by the roller ends as the said base slide with the roller is turned in tracking the target, in a direction parallel to the target path, a bar supported on the seat for rotation about the altitude rod and for radial movement relative thereto and having its distal end pivoted to and slidable on the said roller trackway, a support for the roller trackway whereby the said trackway may be pivotally supported at the roller when sighting is initiated, a rack supported at the upper portion of the altitude rod variable in direction, means to orient the said rack in a direction parallel to the roller trackway and thus to the target path, the said horizontal shaft being provided with a central crank at its said frame support, a U-shaped bracket pivotally mounted on the crank for rotation on an axis normal to the axis of said shaft, a stub pin journalled across the ends of the bracket, a future slant range rod having its upper end universally pivotally connected at a third point to said rack and having its lower portion slidingly engaged through said pin to determine therewith a second point, the said rack being adjustable to vary the radial distance of said third point from said vertical rod to represent the future position of the target according to the scale of the instrument, and the distance between said second and third points representing the slant range to the future target position, a scale plate pivoted upon an axis coaxial with the swivel axis of said roller and cooperative with the lower rear end of the said future slant range rod to indicate the time of flight to the future position, a speedometer mounted on the said base slide and operatively connected to the said roller whereby the speedometer will indicate the target speed, a cylinder adapted to be manually angularly turned in accordance with the time of flight as found by the said scale plate and mounting a chart representing total travel curves as functions of time of flight angularly arranged about the cylinder and target speed axially arranged along the cylinder, a pointer associated with the said speedometer and with the said chart of the cylinder to read total travel therefrom, a pinion engaging the said rack and rotatable at will in accordance to the total travel value determined from the said total travel cylinder to advance the said rack a distance corresponding to the said total travel, a horizontal scale supported on the said base slide frame, a pointer cooperative with the said scale connected to the said stub pin whereby the said pointer will respond to the turning of the said U-shaped bracket by the said future slant range rod to indicate the required lateral lead deflection to the said future target position, a scale fixed to the said U-shaped bracket, a pointer cooperative with the said last named scale and fixed to the said stub pin whereby the angular turning of the stub pin by the future slant range rod will move the said pointer to indicate vertical deflection to the said future target position, the said rack being pivotally mounted on the said altitude rod so that it may be tilted in a direction parallel to the diving or climbing path of the aircraft target, the said future slant range rod turning the said stub pin and sliding in its passage therein to accommodate such tilting adjustment of the said rack.

2. In fire control apparatus for tracking an aircraft target travelling at a known altitude, the combination of a support provided with a seat and means for leveling its seat, a vertical extensible rod supported in the said seat for an extent of vertical adjustment, a horizontal front harness rotatively mounted at the top of the said vertical rod, a rearwardly extending base slide mounted on the said tripod for rotational adjustment about the said vertical rod and for radial adjustment relative thereto, a horizontal shaft rotatively mounted at the rear end of the said base slide and extending parallel to the said harness, a target sighting barrel fixed at each end of the said horizontal shaft whereby the target may be sighted with said barrels by turning the base slide, and with it its pair of sighting barrels and the harness in azimuth about the said vertical altitude rod and by radial movement of the said base slide relative to the altitude rod, a roller swively mounted on the underside of the base slide and vertically aligned with the center axial point of the said horizontal shaft, a horizontal trackway provided with an upper channel adapted to receive said roller, means pivotally supporting said trackway so that the same may be oriented by the roller into a position parallel to the target path as said base slide and roller are turned in tracking the target, a bar supported by the tripod and associated with the altitude rod so that turning of the said bar will turn the altitude rod, a slidable rack supported at the upper portion of the altitude rod variable in direction, said bar serving as means to orient the said rack in a direction parallel to the roller trackway and to the target path, the said horizontal shaft being provided with a central crank at its said frame support, a U-shaped bracket rotatably mounted on the crank for rotation on a radius of the shaft axis, a stub pin journalled across the arms of the bracket, a rod having its upper end swingingly suspended at the distal end of the said rack and having its lower portion slidingly engaged through and projecting rearward from the said stud pin, the said rack being adjustable so that its length extending to one side of the altitude rod may represent the total travel of the target according to a predetermined scale and so that its distal end represents by extension the future position of the target according to this scale, and whereby the said rod by angular position represents the slant range to the future target position, a scale plate pivoted on the support for said roller and cooperative with the lower projecting end of the said future slant range rod to indicate the time of flight to the future position, a speedometer mounted on the said base slide and operatively connected to the said roller whereby the speedometer will indicate the target speed, a cylinder adapted to be manually angularly turned in accordance with the time of flight as found by the said scale plate and mounting a chart representing total travel curves as functions of time of flight angularly arranged about the cylinder and target speed axially arranged along the cylinder, a pointer associated with the said speedometer and with the said chart of the cylinder to read total travel therefrom, means to advance and retract the said rack a distance corresponding to the said total travel, a horizontal scale supported on the said base slide frame, a pointer cooperative with the said scale connected to the said stub pin whereby the said pointer will respond to the turning of the said U-shaped bracket on its said pivot by the said future slant range rod to indicate the required lateral lead deflection to the said future target position, a scale secured to the said U-shaped bracket to turn therewith, a pointer cooperative with the said scale and secured to the said stub pin whereby the angular turning of the stub pin on its longitudinal axis by the future slant range rod will move the said pointer to indicate vertical deflection to the said future target position, the said scale plate and the rear end of the future slant range rod being in cooperating relation to indicate superelevation to the said future position, the said rack being tiltable from the horizontal and means to tilt the rack in a direction parallel to the diving or climbing path of an aircraft target, the said future slant range rod turning the said stub pin and sliding in its passage therein to accommodate such tilting adjustment of the said rack.

3. In fire control apparatus for tracking a target travelling at a known altitude, the combination of a support having a level seat, a vertical extensible rod supported in the said seat for vertical adjustment, a front horizontal harness rotatively mounted at the top of the said rod, a rearwardly extended base slide mounted on the said support for rotational and radial adjustment about the said rod, a horizontal shaft rotatively mounted at the rear end of the said base slide parallel to the harness, respective sighting barrels fixed at the ends of the said shaft and slidingly articulated at their raised, forward ends to the ends of the said harness, the said vertical rod being elevatable above the said seat a vertical distance equal to the said known target altitude according to a predetermined scale, whereby the target may be sighted with said barrels by turning the base slide, and with it its pair of sighting barrels and the harness in azimuth about the said vertical altitude rod, and by radial movement of the said base slide relative to the altitude rod, a roller swivelly mounted on the underside of the base slide and vertically aligned with the center axial point of the said horizontal shaft, a horizontal trackway provided with an upper channel to receive the said roller, and means including the roller ends as the said base slide and the roller are turned in tracking the target, to orient the channel in a direction parallel to the target path, a target bar supported at the upper porion of the altitude rod adjustable in directions parallel to the target path, a rod having its upper end swingingly suspended at the distal end of the said target bar means including a yoke and pin slidingly and rotatively articulating said rod with said horizontal shaft, said bar being adjustable so that its length extending to one side of the altitude rod may represent the total travel of the target according to the said predetermined scale and so that its distal end represents the future position of the target according to this scale, whereby the said rod represents the slant range to the future target position, a scale plate pivoted upon said base slide upon an axis coincident with the swivel axis of said roller and cooperative with the lower end of the said future slant range rod to indicate the time of flight to the future position, a speedometer mounted on the said base slide and operatively connected to the said roller whereby the speedometer will indicate the target speed, a cylinder adapted to be manually angularly turned in accordance with the time of flight as found by the said scale plate and mounting a chart representing total travel curves as functions of time of flight angularly arranged about the cylinder and target speed axially arranged along the cylinder, a pointer associated with the said speedometer and with the said chart of the cylinder to read total travel therefrom, a horizontal scale supported on the said base slide frame, a pointer cooperative with the said scale and associated with the said horizontal shaft so that the said pointer will respond to angular movement of said future slant range rod to indicate required lateral lead deflection to the said future target position, a second scale carried by said yoke, a pointer cooperative with said second scale and carried by said pin whereby the future slant range rod will move the said pointer angularly to indicate angular elevation of said future target position, the said scale plate and the rear end of the future slant range rod being arranged in cooperating relation to indicate superelevation to the said future position, the said target bar being pivotally mounted on the said altitude rod so that it may be tilted in a direction parallel to the diving or climbing path of the aircraft target, and means to so tilt the bar.

4. In fire control apparatus for tracking an aircraft target travelling at a known altitude, the combination of a support, a vertical first rod supported thereby for vertical adjustment corresponding to the said known target altitude according to a predetermined scale, a front harness rotatable around the top of the said vertical rod, a rearwardly extended base slide mounted on the said support for rotational adjustment about the said vertical rod and for radial adjustment relative thereto, a horizontal shaft rotatively mounted at the rear end of the said base slide and extending parallel to the said top harness, respective sighting barrels secured at the ends of the said horizontal spindle with their forward, raised ends slidingly articulated to the ends of the said top harness, a target travel rate device operatively connected to the base slide responsive to angular movement and radial adjustment of the said base slide and an indicator operatively connected thereto to indicate target speed, a scale for indicating time of flight, means for calculating total travel of the target as a product of the said target speed and time of flight, a travel bar, means mounting said bar for rotation about the axis of said first rod so that said bar is positionable in a direction parallel to the path of a target and translatable radially of said first rod to represent to scale the target travel during flight of the projectile, means to radially adjust said bar, a second rod having its upper end connected for universal pivotal movement about a third point at the extended end of said travel bar and having its lower portion universally pivotally and axially slidably articulated at a second point on the axis of said horizontal shaft, the distance between said second and third points representing the slant range to the future target position, scale means associated with said horizontal shaft and said second rod for indicating the azimuth and elevation angles of said second rod, said travel bar being pivotally mounted on said first rod about an axis normal thereto so that said travel bar may be tilted in a direction parallel to the path of a diving or climbing target, and means to so tilt said bar.

5. In fire control apparatus for tracking an aircraft target travelling at a known altitude, the combination of a support, a vertical first rod supported thereby for vertical adjustment corresponding to the said known target altitude according to a predetermined scale, a front harness horizontally rotatable at the top of the said first rod, a rearwardly extended base slide mounted on the said support for rotation about the said vertical rod and for radial adjustment relative thereto, a horizontal shaft rotatively mounted at the rear end of the said base slide and extending parallel to the said top harness, respective sighting barrels secured at the ends of the said horizontal spindle with forward, raised ends pivotally and longitudinally slidably articulated to the ends of said harness, a travel bar carried by said first rod and adjustable about the axis thereof into a position parallel to the target path and translatable radially of said first rod, a second rod having its upper end universally pivotally connected at a third point to the extended end of said travel bar and having its lower portion axially slidable and pivotally articulated to said horizontal shaft at a second point and projecting beyond said second point, the distance between said second and third points representing the slant range to the future target position, scale means carried by said base slide, pointers controlled by said second rod and cooperating with said scale means to indicate the elevation and azimuth angles of said second rod, means to extend and adjust the azimuth of said travel bar, a speedometer, means responsive to travel of said second point as said base slide and barrels are rotatably and radially adjusted to maintain said barrels directed upon the target, to effect operation of said speedometer, and means adjustable in accordance with the product of time of flight of the projectile and the target speed as determined by said speedometer, for radially translating said travel bar to position said third point from the axis of said first rod, a distance proportional to the travel of said target during time of flight of the projectile.

6. In fire control apparatus for tracking an aircraft target travelling at a known altitude, the combination of a support, a vertical first rod supported thereby for vertical adjustment corresponding to the said known target altitude according to a predetermined scale, a front harness horizontally rotatable at the top of the said vertical rod, a rearwardly extended base slide mounted on the said support for rotation about the said vertical rod and for radial adjustment relative thereto, a horizontal shaft rotatively mounted at the rear end of the said base slide and extending parallel to the said top harness, respective sighting barrels secured at the ends of the horizontal shaft with forward, raised ends longitudinally slidably and pivotally articulated to the ends of said harness, a travel bar carried by and adjustable about the axis of said first rod parallel to the target path and radially extendable relatively to said first rod a distance proportional to the total travel of the target during time of flight of the projectile, a second rod having its upper end universally pivotally connected at a third point on the extended end of said travel bar and having its lower portion axially slidably and pivotally articulated at a second point on the axis of said horizontal shaft and projecting beyond said second point, the distance between said points measured along second rod representing the slant range to the future target position, a scale device pivoted upon a normally vertical axis through said second point and in cooperating relation with the projecting end of said second rod to indicate time of flight and superelevation, scale means carried by said base slide adjacent said second point, indicators controlled by said second rod and cooperating with said scale means to indicate the elevation and azimuth of said second rod, said travel bar being pivotally mounted on said first rod on an axis normal thereto so that said first rod may be tilted in a direction parallel to an inclined path of the target, and means to extend and adjust the direction of said travel bar.

7. In fire control apparatus for tracking an aircraft target travelling at a known altitude, the combination of a support, a vertical first rod supported thereby for vertical adjustment corresponding to the said known target altitude according to a predetermined scale, a front harness horizontally rotatable around the top of the said vertical rod, a rearwardly extended base slide mounted on the said support for rotation about the said vertical rod and for radial adjustment relative thereto, a horizontal shaft rotatively mounted at the rear end of the said base slide and extending parallel to the said harness, respective sighting barrels secured at the ends of the horizontal shaft for pivotal movement about the axis thereof and having their forward ends axially slidably and pivotally articulated to the ends of said harness, a travel bar carried by said first rod and positionable in azimuth about the axis thereof and extendable to one side of said first rod a distance proportional to the total travel of the target during time of flight of the projectile according to said predetermined scale, a second rod having one end universally pivoted at a third point on the extended end of said travel bar and having its lower portion axially slidably and pivotally articulated at a second point on the axis of said horizontal shaft and projecting therebeyond, the distance between said second and third points representing the slant range to the future target position, a scale device carried by said base slide adjacent and in cooperating relation with the projecting end of said second rod to indicate time of flight and superelevation, scale means carried by the base slide concentric of axes through said second point, indicating means controlled by said second rod and operating over said scale means for indicating the elevation and azimuth of said second rod, and means to extend and adjust the azimuth of said travel bar.

8. In fire control apparatus for tracking an aircraft target travelling at a known altitude, the combination of a support, a vertical first rod supported thereby for vertical adjustment corresponding to the said known target altitude according to a predetermined scale, a front horizontal harness rotatable on a vertical axis at the top of the said first rod, a rearwardly extended base slide mounted on the said support for rotational adjustment about the said first rod and for radial adjustment relative thereto, a horizontal shaft rotatively mounted at the rear end of said base slide and extending parallel to said harness, respective sighting barrels secured at the ends of the horizontal shaft with their forward ends slidingly and pivotally articulated to the ends of the said harness, a travel bar carried by the said first rod and rotatable about the axis of said first rod to a position parallel to the target path and extendable to one side of said first rod a distance corresponding to the total travel of the target during time of flight of the projectile, a second rod having its upper end universally pivotally connected at a third point on the extended end of said travel bar and having its lower portion slidingly and rotatively articulated at a second point upon the axis of said horizontal shaft, the distance between said points along said rod representing the slant range to the future target position at the extended end of said travel bar.

9. In a data computer, in combination, a support, a vertical shaft mounted for vertical adjustment on said support, a horizontal range bar mounted on said support for rotation about, and for translation radially of, the axis of said shaft, a support bar carried by said range bar and axially rotatable about a first axis normal to said range bar and shaft, said first axis defining a horizontal reference plane, a harness rotatably carried at the top of said shaft and defining a second horizontal axis rotatable in azimuth, and a slant range bar fixed to said support bar normally thereto and pivotally and slidably connected with said harness for movement about and radially of said second axis.

10. In a data computer, a support, a vertical shaft mounted for vertical adjustment on said support, a horizontal range bar mounted on said support for rotation about and longitudinal translation radially of the axis of said shaft, a slant range barrel, means mounting said barrel on said bar for rotation about a horizontal first axis transverse to said bar and barrel, the distance of said first axis from the axis of said shaft representing horizontal range to the scale of the instrument, a harness swiveled at the top of said shaft for rotation about the axis thereof and defining a horizontal second axis normal to said shaft, said barrel being connected at one end with said harness for pivoting about and radial translation relatively to said second axis, the vertical distance between said first and second axes, as determined by the vertical adjustment of said shaft, representing altitude of the target to the aforesaid scale of the instrument.

11. In a data computer, in combination, a support, a vertical shaft mounted for axial translation on said support, a harness swiveled at the top of said shaft and defining a first axis normal to said shaft and intersecting the axis of said shaft in a first point, a horizontal range bar mounted on said support for rotation about and longitudinal translation radially of said shaft, a support bar, means mounting said support bar for rotation about a horizontal second axis fixed transversely of said range bar, said support bar extending longitudinally along said second axis, a barrel adapted to define a line of sight to a target, said barrel being fixed at one end to said support bar, at right angles thereto, and connected at its other end to said harness for pivotal movement about, and sliding radially of, said first axis, said first and second axes being parallel and said second axis being normal to and intersecting in a second point, a vertical reference plane containing the axis of said shaft, and means responsive to translation and rotation of said horizontal range bar as the result of continuously training said barrel upon a moving target, to measure the linear velocity of said second point as a measure of the velocity of said target.

12. A device as recited in claim 11, said last-named means including a travel channel, means on said support mounting said travel channel for pivotal movement about a vertical axis variable in distance from the axis of said shaft, roller means guided for movement on and along said travel channel, means mounting said roller for swiveling about a vertical axis through said second point, a speedometer, and means responsive to rotation of said roller means on and along said travel channel for operating said speedometer.

13. A device as recited in claim 11, a travel bar mounted on said shaft for longitudinal translation to vary the radial distance of a third point on said bar from said first point a future slant range rod connecting said second and third points, and indicator means connected with said rod to measure the elevation and azimuth of the same.

14. A device as recited in claim 11, a travel bar mounted on said shaft for longitudinal translation to vary the radial distance of a third point on said bar from said first point, a future slant range rod connecting said second and third points, means controlled by said future slant range rod to indicate the azimuth and elevation angles of said rod, speedometer means to measure the rate of linear displacement of said second point as said barrel is continuously directed toward said target, and means for translating said travel bar to vary the distance between said first and third points proportional to the product of time of flight of a projectile and rate as determined by said speedometer means.

15. In a device as recited in claim 11, a travel bar mounted upon said shaft for longitudinal translation to vary the radial distance of a third point on said bar from said first point in proportion to target travel during time of flight of the projectile, a future slant range rod universally pivoted on said travel bar at said third point and universally pivotally and slidably connected to said second point, a vertical superelevation scale plate pivoted on a vertical axis through said second point, and cooperating with the adjacent free end of said rod to indicate superelevation corresponding to the instantaneous positions of said rod.

16. In a gun fire computer, means representing to scale a right triangle comprising a hypotenuse pivotally and slidably intersecting a first vertical side at a first point, and pivotally intersecting a second horizontal side at a second point, means mounting said triangle at the intersection of said sides so that each side is translatable in the direction of its length whereby the length of said first side may be varied proportional to altitude of a moving aerial target, said triangle being rotatable about said first side as an axis, and means to measure the rate of movement of said second point in terms of the linear speed of said target as said hypotenuse is continually trained upon said target as a result of combined rotation of said triangle about said first side and simultaneous sliding of said second side to vary the length of said second side.

DOUGLAS E. MORRISON.